(12) United States Patent
Razavi

(10) Patent No.: US 7,718,745 B2
(45) Date of Patent: May 18, 2010

(54) HETEROGENISATION OF CATALYST COMPONENTS

(75) Inventor: Abbas Razavi, Mons (BE)

(73) Assignee: Total Petrochemicals Research Feluy, Feluy (BE)

( * ) Notice: Subject to any disclaimer, the term of this patent is extended or adjusted under 35 U.S.C. 154(b) by 633 days.

(21) Appl. No.: 10/564,202

(22) PCT Filed: Jul. 6, 2004

(86) PCT No.: PCT/EP2004/051370

§ 371 (c)(1),
(2), (4) Date: Jul. 17, 2006

(87) PCT Pub. No.: WO2005/005494

PCT Pub. Date: Jan. 20, 2005

(65) Prior Publication Data

US 2007/0021574 A1    Jan. 25, 2007

(30) Foreign Application Priority Data

Jul. 9, 2003    (EP) .................................. 03102061

(51) Int. Cl.
C08F 4/64    (2006.01)
C08F 4/72    (2006.01)

(52) U.S. Cl. ........................ 526/172; 526/161; 526/126; 526/351; 526/352

(58) Field of Classification Search .................... 556/53; 526/172, 161
See application file for complete search history.

(56) References Cited

U.S. PATENT DOCUMENTS 5,747,405 A * 5/1998 Little et al. .................. 502/113

FOREIGN PATENT DOCUMENTS

DE    10017663    10/2001

OTHER PUBLICATIONS

Zemánek et al., Collect. Czech. Chem. Commun., 2001, 66, 605-620.*
v. H. Spence et al., Organometallics, 1995, 14, 4617-4624.*
Alt et al., J. Organomet. Chem., 2001, 628, 169-182.*
Reb et al., J. Mol. Catal. A : Chemical, 2001, 174, 35-49.*
Skeřil et al., J. Mol. Catal. A : Chemical, 2004, 224, 97-103.*

* cited by examiner

*Primary Examiner*—David Wu
*Assistant Examiner*—Rip A. Lee
(74) *Attorney, Agent, or Firm*—Tenley R. Krueger

(57) ABSTRACT

Provided is a method for the production of an olefin polymer, which method comprises polymerizing an olefin monomer in the presence of a metallocene catalyst, which catalyst comprises one or more alkyl moieties having a terminal olefin group, and is selected from a catalyst of formula (I): R"(CpR$_q$)XMQ$_p$ wherein Cp is a substituted or unsubstituted cyclopentadienyl or fluorenyl ring; R" is a structural bridge between Cp and X imparting stereorigidity to the component; each R is the same or different and is selected from a hydrocarbyl group having from 1-20 carbon atoms, a halogen, an alkoxy group, an alkoxyalkyl group, an alkylamino group or an alkylsilylo group; q is an integer from 0-8; X is a heteroatom from group VA or group VIA; M is a metal atom from group 11113, IVB, VB or VIB in any of its theoretical oxidation states; and each Q is a hydrocarbon having from 1-20 carbon atoms or is a halogen; p is an integer which is the oxidation state of M minus 2; wherein the alkyl moiety having a terminal olefin group is a substituent on R", Cp and/or X; and from a catalysts of formula (II): (L)$_n$M(Q)$_p$ wherein L is an heteroatom containing ligand; n is an integer of 1, 2, or 3; M is selected from Ti, Zr, Sc, V, Cr, Fe, Co, Ni, Pd, or a lanthanide metal; each Q is independently a hydrocarbon having 1-20 carbon atoms or a halogen; and p is the valence of M minus the sum of the coordination numbers of all L; wherein the alkyl moiety having a terminal olefin group is a substituent on L, and/or Q.

11 Claims, No Drawings

HETEROGENISATION OF CATALYST COMPONENTS

The present invention relates to a process for the production of an olefin polymer, in particular an ethylene or propylene polymer, and polymers produced by the process. The invention also relates to a catalyst for use in the method of the invention. The catalyst is advantageous, since it is more easily heterogenised than conventional catalysts. The polymers produced according to the present method are generally more pure than those previously obtainable.

It is well known that homogeneous olefin polymerisation catalysts have the disadvantage that they produce polymer products which are in a very fine powder form, having very low bulk density. Fine powder is problematic for a number of different reasons. It tends to adhere to the walls of the continuous reactor systems used to produce it, reducing yield and also interfering with the thermal exchange system needed to control reaction conditions. Eventually it can foul the reactor sufficiently to require the process to be halted for maintenance. Additionally, once produced, the fine powder presents further transportation problems similar to those already well known for fine powder products.

In the past, attempts have been made to solve these problems. Catalysts have been immobilised on organic or inorganic carriers which are insoluble in the polymerisation medium. This has been termed heterogenising the catalyst. It is well known, for example, to support the catalyst on MAO treated silica to heterogenise it, before using it in an industrial process, such as in a loop slurry reactor system. The removal of the catalyst from solution causes a change in the nature of the polymer product produced. Instead of a fine powder, a more coarse powder or fluff is produced. Fluff does not suffer problems to the same degree as those experienced for fine powders.

Typically, attempts to heterogenise catalysts have been directed to standard metallocene catalysts, such as early transition metal sandwich compounds comprising inter alia zirconium. These catalysts have been extensively used in bridged and unbridged forms. The above heterogenisation methods have been reasonably successful with these catalysts, but have not been as useful with other metallocene catalysts, such as with constrained geometry metallocenes and late transition metal metallocenes. With these other metallocenes, the use of a support for the catalyst has led to either complete inactivation of catalytic activity, or at least a significant reduction in activity. Thus other solutions are required for heterogenising these catalysts.

It is known to incorporate alkyl ligands comprising an unsaturated group into standard early transition metal catalysts. Such compounds are described, for example, in published European patent application EP 0,586,167, U.S. Pat. Nos. 5,726,264 and 5,780,659. However, these documents are concerned with the formation of new catalysts useful in standard olefin polymerisation procedure only.

It is an object of the present invention to solve the problems associated with the above prior art. It is a further object of the present invention to provide an improved method for the formation of olefin polymers, which method is capable of heterogenising constrained geometry metallocene catalysts, and late transition metal catalysts, without impairing the activity of these catalysts. It is a further object of the present invention to provide improved catalysts for forming olefin polymers having improved properties. It is also an object of the invention to produce an olefin polymer having improved purity, employing the methods and catalysts of the present invention.

Accordingly, the present invention provides a method for the production of an olefin polymer, which method comprises polymerising an olefin monomer in the presence of a catalyst component selected either from a complex of formula (I):

$$R''(CpR_q)XR'MQ_2 \qquad (I)$$

wherein Cp is a substituted or unsubstituted cyclopentadienyl or fluorenyl ring; R" is a structural bridge between Cp and X imparting stereorigidity to the component; each R is the same or different and is selected from a hydrocarbyl group having from 1-20 carbon atoms, a halogen, an alkoxy group, an alkoxyalkyl group, an alkylamino group or an alkylsilylo group; q is an integer from 0-8; X is a heteroatom from group 15 or 16 of the Periodic Table; M is a metal atom from group 4 of the Periodic Table; R' is hydrogen or a hydrocarbyl having from 1 to 20 carbon atoms and each Q is a hydrocarbon having from 1-20 carbon atoms or is a halogen;

or from a complex of formula (II):

$$(L)_nM(Q)_p \qquad (II)$$

wherein L is an heteroatom-containing ligand; n is an integer of 1, 2, or 3; M is selected from Ti, Zr, Sc, V, Cr, Fe, Co, Ni, Pd, or a lanthanide metal; each Q is independently a hydrocarbon having 1-20 carbon atoms or a halogen; and p is the valence of M minus the sum of the coordination numbers of all L;

characterised in that the catalyst component comprises one or more alkyl moieties having a terminal olefin group, and wherein the alkyl moiety having a terminal olefin group is a substituent on R", Cp and/or X in the complex of formula I or is a substituent on L, and/or Q in the complex of formula II.

The methods of the present invention are particularly advantageous, since they allow for the production of improved olefin polymers, having high purity. This is because the catalysts employed in the present invention prevent migration of polymerising chains during the polymerisation process. Such catalysts could not be employed effectively before, due to problems with heterogenising the catalysts. These problems have now been solved by the present invention.

In complexes of formula I, typically, when Cp is a cyclopentadienyl ring, at least one group R is positioned on the Cp ring such that it is distal to the bridge R", which group R comprises a bulky group of the formula $ZR^*_3$ in which Z is an atom from group 14 of the Periodic Table and each $R^*$ is the same or different and is chosen from a hydrogen or a hydrocarbyl group having from 1-20 carbon atoms. It is preferred that $ZR^*_3$ is selected from $C(CH_3)_3$, $C(CH_3)_2Ph$, $CPh_3$, and $Si(CH_3)_3$. It is further preferred that X in formula (I) is N or P.

Typically R" comprises an alkylidene group having 1 to 20 carbon atoms, a germanium group, a silicon group, a siloxane group, an alkyl phosphine group, or an amine group. More preferably R" comprises a substituted or unsubstituted ethylenyl group, an isopropylidene ($Me_2C$) group, a $Ph_2C$ group, or a $Me_2Si$ group.

Preferably Cp is a fluorenyl, more preferably, it is symmetrically substituted fluorenyl with substituents in positions 2 and 7 or in positions 3 and 6. The most preferred substituent is tert-butyl.

Preferably, M is Ti, Zr, or Hf and preferably Q is Cl or methyl.

In complexes of formula II, preferably, when L is a bidentate ligand selected from:

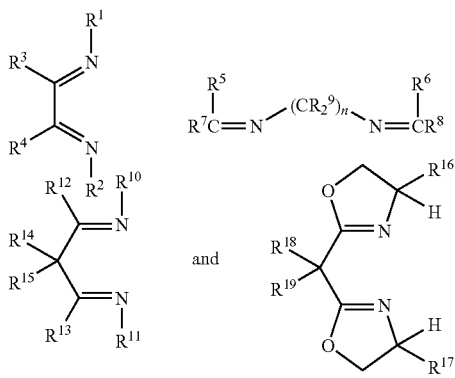

wherein n is an integer of 2 or 3; $R^1$, $R^2$, $R^7$, $R^8$, $R^{10}$, $R^{11}$, $R^{12}$, $R^{13}$, $R^{16}$ and $R^{17}$ are each independently a hydrocarbyl or a substituted hydrocarbyl group, and $R^3$, $R^4$, $R^5$, $R^6$, $R^9$, $R^{14}$, $R^{15}$, $R^{18}$, and $R^{19}$ are each independently a hydrogen, hydrocarbyl or substituted hydrocarbyl group; and wherein one or more of the following when taken together may form a ring: $R^3$ and $R^4$, both of $R^9$, $R^5$ and $R^7$, $R^6$ and $R^8$, $R^{18}$ and $R^{19}$.

Alternatively, it is preferred that L in formula (II) is a tridentate ligand, having the following formula:

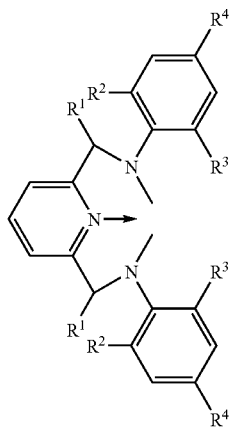

or three monodentate ligands having the following arrangement:

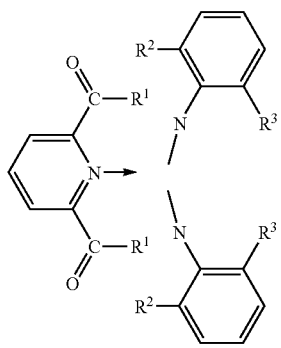

wherein $R^1$, $R^2$ $R^3$ and $R^4$ are each independently a hydrogen, hydrocarbyl or substituted hydrocarbyl group.

In these new single site catalyst components, lanthanide (rare earth) metals may be employed, but most preferably M is selected from Ni, Fe and Co.

Although the invention may be applied to any olefin polymerisation, the olefin monomer employed typically comprises ethylene and/or propylene.

The alkyl moiety having a terminal olefin group is not especially limited. Preferably it comprises a substituted or unsubstituted alkyl group having from 2-20 carbon atoms. More preferably, the alkyl moiety having a terminal olefin group comprises a ω-ethylenyl, ω-propylenyl, ω-butylenyl, ω-pentylenyl, ω-hexylenyl, ω-heptyleneyl, ω-octylenyl, ω-nonylenyl or a ω-decylenyl group.

Without being bound by theory, it is believed that the alkyl moiety may insert into polymerising chains, trapping the catalyst component in short polymer units. This renders the catalyst insoluble, providing the desired heterogenisation. In some embodiments, the catalyst may undergo a pre-polymerisation step in the method, in order to optimise heterogenisation. However, this is not essential, and the catalyst may be used directly in the main polymerisation process if desired.

The present invention also provides an olefin polymer, obtainable according to a method as defined above.

Further provided is a metallocene catalyst as defined above.

Also provided is use of a metallocene catalyst for producing an olefin polymer, which catalyst is a catalyst as defined above.

The substituents that may be present on the cyclopentadiene and fluorene rings, on the bridge R", and on X and L will now be described in more detail. The substituent or substituents are not particularly limited. The cyclopentadiene ring (Cp) may be unsubstituted, but is preferably at least monosubstituted. If desired, it may comprise one or more further substituents, provided that these further substituents do not adversely interfere with the ability of the present method to produce olefin polymers. The Cp ring may be substituted with the same substituent throughout, or with different substituents.

When the substituent comprises an organic group, the organic group preferably comprises a hydrocarbon group. The hydrocarbon group may comprise a straight chain, a branched chain or a cyclic group. Independently, the hydrocarbon group may comprise an aliphatic or an aromatic group. Also independently, the hydrocarbon group may comprise a saturated or unsaturated group.

When the hydrocarbon comprises an unsaturated group, it may comprise one or more alkene functionalities and/or one or more alkyne functionalities. When the hydrocarbon comprises a straight or branched chain group, it may comprise one or more primary, secondary and/or tertiary alkyl groups. When the hydrocarbon comprises a cyclic group it may comprise an aromatic ring, an aliphatic ring, a heterocyclic group, and/or fused ring derivatives of these groups. The cyclic group may thus comprise a benzene, naphthalene, anthracene, indene, fluorene, pyridine, quinoline, thiophene, benzothiophene, furan, benzofuran, pyrrole, indole, imidazole, thiazole, and/or an oxazole group, as well as regioisomers of the above groups.

The number of carbon atoms in the hydrocarbon group is not especially limited, but preferably the hydrocarbon group comprises from 1-40 C atoms. The hydrocarbon group may thus be a lower hydrocarbon (1-6 C atoms) or a higher hydrocarbon (7 C atoms or more, e.g. 7-40 C atoms). The number of atoms in the ring of the cyclic group is not especially limited, but preferably the ring of the cyclic group comprises from 3-10 atoms, such as 3, 4, 5, 6 or 7 atoms.

The substituent on the heteroatom X may comprise one or more of any of the common functional groups in organic chemistry, such as hydroxy groups, carboxylic acid groups, ester groups, ether groups, aldehyde groups, ketone groups, amine groups, amide groups, imine groups, thiol groups, thioether groups, sulphate groups, sulphonic acid groups, and phosphate groups etc. The substituent may also comprise derivatives of these groups, such as carboxylic acid anhydrydes and carboxylic acid halides.

In addition, any substituent may comprise a combination of two or more of the substituents and/or functional groups defined above.

Typically, the substituents are independently selected from an aryl group and a hydrocarbyl group having from 1-20 carbon atoms. The most preferred substituents are methyl groups. Other preferred substituents include Et, n-Pr, i-Pr, n-Bu, t-Bu, Me$_3$Si, R—O, cycloalkyl, and halogen.

In respect of the Cp ring, it is especially preferred that at least one group R comprises a bulky group of the formula ZR*$_3$ in which Z is an atom from group 14 of the Periodic Table and each R* is the same or different and is chosen from a hydrogen or a hydrocarbyl group having from 1-20 carbon atoms. When such an R group is present, it is also preferred that at least one further group R is present comprising a group of the formula YR#$_3$ in which Y is an atom from group 14 of the Periodic Table, and each R# is the same or different and is chosen from a hydrogen or a hydrocarbyl group having from 1-7 carbon atoms.

Regarding the position of the substituents, generally at least one group R is positioned on the cyclopentadienyl ring such that it is distal to the bridge R". However, in some embodiments of the invention at least one group R is positioned on the cyclopentadienyl ring such that it is proximal to the bridge R". It is particularly preferable that the cyclopentadienyl ring comprises a bulky substituent ZR*$_3$ distal to the bridge R" and a substituent YR#$_3$ proximal to the bridge and non-vicinal to ZR*$_3$. In some embodiments of the present invention, the cyclopentadienyl ring comprises a substituent ZR*$_3$ distal to the bridge R"; a substituent YR#$_3$ proximal to the bridge R" and non-vicinal to ZR*$_3$; and a further substituent YR#$_3$ proximal to the bridge and vicinal to ZR*$_3$. The cyclopentadienyl ring may also comprise two substituents ZR*$_3$, each distal to the bridge R", if desired.

In a preferred embodiment, Z and Y in the above formulae independently comprise carbon or silicon. The catalyst compounds used in the present method are typically compounds in which ZR*$_3$ is selected from C(CH$_3$)$_3$, C(CH$_3$)$_2$Ph, CPh$_3$, and Si(CH$_3$)$_3$. It is particularly preferred that ZR*$_3$ comprises C(CH$_3$)$_3$. In further preferred embodiments of the present invention, YR#$_3$ comprises a methyl group or a trimethylsilyl group (TMS)

The substitution pattern of the fluorene ring, if present, is not especially limited, provided that it does not adversely interfere with the co-polymerisation method of the present invention. The fluorine ring generally comprises a substituent at the 3-position or at the 6-position. Most preferably both the 3- and the 6-position are substituted. Alternatively the fluorine ring comprises a substituent at both the 2-and 7-positions.

The type of bridge present between the rings in the above-described catalysts is not itself particularly limited. Typically R" comprises an alkylidene group having 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent comprises a silyl radical or a hydrocarbyl radical having at least one carbon atom to form the bridge, such as a substituted or unsubstituted ethylenyl radical (e.g. —CH$_2$CH$_2$—). Most preferably R" is isopropylidene (Me$_2$C), Ph$_2$C, ethylenyl, or Me$_2$Si.

In addition to the above metallocene compound, the catalyst used in the present methods may comprise one or more activating agents capable of activating any one or more of the catalyst components. Typically, the activating agent comprises a boron-containing activating agent.

Suitable boron-containing activating agents may comprise a triphenylcarbenium boronate, such as tetrakis-pentafluorophenyl-borato-triphenylcarbenium as described in EP-A-0427696:

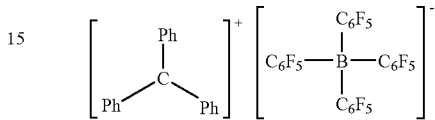

or those of the general formula below, as described in EP-A-0277004 (page 6, line 30 to page 7, line 7):

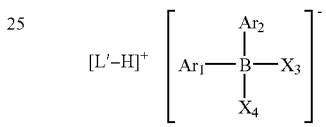

Other preferred activating agents include hydroxy isobutylaluminium and a metal aluminoxinate. These are particularly preferred when at least one Q in the general formula for metallocenes comprises an alkyl group.

The catalyst systems employed in the present invention may be employed in any type of co-polymerisation method, provided that the required catalytic activity is not impaired. In a preferred embodiment of the present invention, the catalyst system is employed in a slurry process, which is heterogeneous. In a slurry process, due to the advantages of the present invention, it is not necessary to immobilise the catalyst system on an inert support.

The amount of activating agent and metallocene usefully employed in the preparation of the solid support catalyst can vary over a wide range. Preferably, the activating agent to transition metal mole ratio is in the range between 1:1 and 100:1, preferably in the range 5:1 and 50:1.

The invention claimed is:

1. A method for the production of an olefin polymer comprising:

(a) providing a catalyst system having a catalyst component characterized by formula I:

R"(CpR$_q$)XR'MQ$_2$          (I)

wherein: Cp is a cyclopentadienyl ring; R" is a structural bridge between Cp and X imparting stereorigidity to the component; each R is the same or different and is selected from a hydrocarbyl group having from 1-20 carbon atoms, a halogen, an alkoxy group, an alkoxyalkyl group, and alkylamino group or an alkylsilylo group and at least one group R is positioned on the Cp ring at a position distal to the bridge R", which group R comprises a bulky group of the formula ZR*$_3$ in which Z is an atom from Group 14 of the Periodic Table, and each R* is the same or different and is a hydrogen or a hydrocarbyl group having from 1-20 carbon atoms; q is an integer from 1-4; X is a heteroatom from Group 15 or 16 of the Periodic Table; M is a metal atom from Group 4 of the Periodic Table; R' is a hydrogen or a hydrocarbyl having from 1-20 carbon atoms; and each Q is a hydrocarbon having from 1-20 carbon atoms or is a halogen; characterized in that the catalyst component comprises at least one alkyl moiety having a terminal olefin group selected from a ω-ethylenyl, ω-propylenyl, ω-pentylenyl, ω-hexylenyl, ω-heptylenyl, ω-octylenyl, ω-nonylenyl, or a ω-decylenyl group, wherein the alkyl moiety having a terminal olefin group is a substituent on at least one of R", Cp and X in the complex of formula I;

(b) contacting said catalyst system with at least one olefin monomer to produce an olefin polymer; and (c) recovering said olefin polymer.

2. The method of claim 1 wherein the olefin monomer comprises ethylene or propylene.

3. The method of claim 1 wherein the alkyl moiety having a terminal olefin group comprises a substituted or unsubstituted alkyl group having from 2-20 carbon atoms.

4. The method of claim 1 wherein at least another group R in formula I is positioned on a Cp ring at a position proximal to the bridge and non-vicinal to the group $ZR^*_3$.

5. The method of claim 4 wherein said another group R is characterized by the formula $YR\#_3$ wherein $YR\#_3$ comprises a methyl group or a trimethyl silyl group.

6. The method of claim 1 wherein $ZR^*_3$ is selected from the group consisting of $C(CH_3)_3$, $C(CH_3)_2Ph$, $CPh_3$ and $Si(CH_3)_3$.

7. The method of claim 1 wherein X in formula (I) is N or P.

8. The method of claim 7 wherein Q is Cl or Me.

9. The method of claim 1 wherein R" is selected from the group consisting of an alkylidene group having from 1-20 carbon atoms, a germanium group, a silicon group, a siloxane group, an alkyl phosphine group and an amine group.

10. The method of claim 9 wherein R" is selected from the group consisting of a substituted or unsubstituted ethylenyl group, an isopropylidene ($Me_2C$) group, a $Ph_2C$ group and an $Me_2Si$ group.

11. The method of claim 9 wherein M is Ti, Zr or Hf.

* * * * *